United States Patent
Pohl

(10) Patent No.: US 8,036,783 B2
(45) Date of Patent: Oct. 11, 2011

(54) DEVICE FOR ERROR DETECTION OF ADJUSTABLE FLAPS

(75) Inventor: Ulrich Pohl, Ganderkesee (DE)

(73) Assignee: Airbus Deutschland GmbH, Hamburg (DE)

( * ) Notice: Subject to any disclaimer, the term of this patent is extended or adjusted under 35 U.S.C. 154(b) by 472 days.

(21) Appl. No.: 12/158,038

(22) PCT Filed: Dec. 4, 2006

(86) PCT No.: PCT/EP2006/011618
§ 371 (c)(1),
(2), (4) Date: Nov. 24, 2008

(87) PCT Pub. No.: WO2007/065622
PCT Pub. Date: Jun. 14, 2007

(65) Prior Publication Data
US 2009/0212977 A1 Aug. 27, 2009

(30) Foreign Application Priority Data
Dec. 6, 2005 (DE) .......................... 10 2005 058 192

(51) Int. Cl.
*G08B 23/00* (2006.01)
(52) U.S. Cl. .............................. 701/4; 340/963; 702/183
(58) Field of Classification Search ...... 701/4; 244/213, 244/75, 214; 340/963, 962; 702/182–185
See application file for complete search history.

(56) References Cited

U.S. PATENT DOCUMENTS

| | | | |
|---|---|---|---|
| 5,628,477 A * | 5/1997 | Caferro et al. | 244/214 |
| 6,299,108 B1 * | 10/2001 | Lindstrom et al. | 244/213 |
| 6,466,141 B1 * | 10/2002 | McKay et al. | 340/963 |

FOREIGN PATENT DOCUMENTS

| | | |
|---|---|---|
| EP | 0726201 A1 | 8/1996 |
| EP | 0818387 B1 | 1/1998 |
| EP | 922633 B | 6/1999 |
| EP | 1088753 A | 4/2001 |
| RU | 2 000 250 C1 | 9/1993 |
| RU | 2 071 440 C1 | 1/1997 |

* cited by examiner

*Primary Examiner* — Thomas Black
*Assistant Examiner* — Marthe Marc-Coleman
(74) *Attorney, Agent, or Firm* — Ingrassia Fisher & Lorenz P.C.

(57) ABSTRACT

With a device for error detection of adjustable flaps on aircraft wings, it is proposed that each flap is provided with a tube as a transmission element arranged in the wing span. The tube is connected fixedly at one end with the flap and is rotatably held. On the free end of the tube, a measuring arm is fixedly arranged on the tube and a sensor fixed to the flap structure is arranged. When an error occurs, the flap twists, whereby a distance change between the sensor and measuring arm occurs. The signals of the sensor are transmitted for error localization of each flap to an evaluation device, which switches off the drive via a control device with occurring errors.

27 Claims, 2 Drawing Sheets

DEVICE FOR ERROR DETECTION OF ADJUSTABLE FLAPS

CROSS-REFERENCE TO RELATED APPLICATIONS

This application is a U.S. National-Stage entry under 35 U.S.C. §371 based on International Application No. PCT/EP2006/011618, filed Dec. 4, 2006, which was published under PCT Article 21(2) and which claims priority to German Application No. 10 2005 058 192.7, filed Dec. 6, 2005, which are all hereby incorporated in their entirety by reference.

TECHNICAL FIELD

The invention relates to a device for error detection of adjustable flaps, such as landing flaps, of aircraft wings in the form of defective positions or defective drives, by an evaluation device for switching off drives, whereby the flaps are adjustable by central drive units via a shaft and each flap is held and adjustable via associated local adjustment elements.

BACKGROUND

With assemblies of a device for error detection of adjustable flaps, in the event of an error of a local actuating drive, synchronization may no longer provided and the flap twists and cants. If the error is not recognized in a timely manner and the flaps are further actuated, this may lead to destruction of the flap structure.

According to EP-B-922 633, it is already known to assign a torsion and cant via an arrangement of the flap positions of each drive station, whereby the flap positions are supplied with a rotary sensor via rod/crank assemblies. It was shown, however, that this type of embodiment with a rod or a crank assembly is disadvantageous, since its tolerances negatively affect the measurement accuracy. This has the result that the flap structures and fittings have to be designed at unnecessarily high error strengths. With flaps with fixed rotational axes, a high number of additional components, therefore, are required.

SUMMARY

There may be a need to produce in a simple manner permanent torsion- and cant monitoring for flaps with error localization, which makes possible a simple design and permits a construction with minimal weight.

To avoid a destruction of the flap structure, it is known to associate one design with a doubled load path of the local adjustment device. In addition, it may be possible that torsion and cant is arranged or detected via a positioning comparison between the flaps at a separating point between two flaps.

According to an exemplary embodiment of the present invention each flap has a transmission element arrangement in the wing span, such as a tube, a rod, or the like, which is rotatably held on the flap and is fixedly connected in an end region with the flap, and at the other end region has an element as a reference point for an associated sensor on the flap structure for detecting a distance change by a twisting with asymmetry or torsion of the flap.

In this manner, it is possible to produce a weight-optimal assembly and to detect an error of a local adjusting element as well as to avoid, by switching off of the central drive, a flap torsion or flap cant and to determine other cases or errors of the transmission, such as shaft breakage.

Thus, a torsion of the flaps may be measured directly and the information of the flap angle at a wing span position is transformed mechanically to other positions and there, the difference may be measured.

A simple design of an element as a reference point, may be provided, in that the transmission element may support a fixed, associated measurement arm for formation of the reference point, which may be associated with the sensor.

Alternatively, for dual detection, it is proposed that the transmission element may have opposite, fixedly arranged measuring arms on both sides for forming reference points, which may be associated with sensors arranged on the flap structure, respectively.

In addition, it is proposed that the measurement value of the parallel arranged sensors may be supplyable by different evaluation units.

In order to monitor the error-free function with different values of the parallel associated sensors, it is provided that the measurement values of both sensors may be supplyable to evaluation units with a comparison unit and with deviations of predetermined thresholds; a switching-off of the drive units may be adjustable.

Accordingly, it is desirable to provide a simple design, in that the sensors may be formed in the manner of turbulence sensors or inductive sensors. In addition, other desirable features and characteristics will become apparent from the subsequent summary and detailed description and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements.

DETAILED DESCRIPTION

Figure 1:
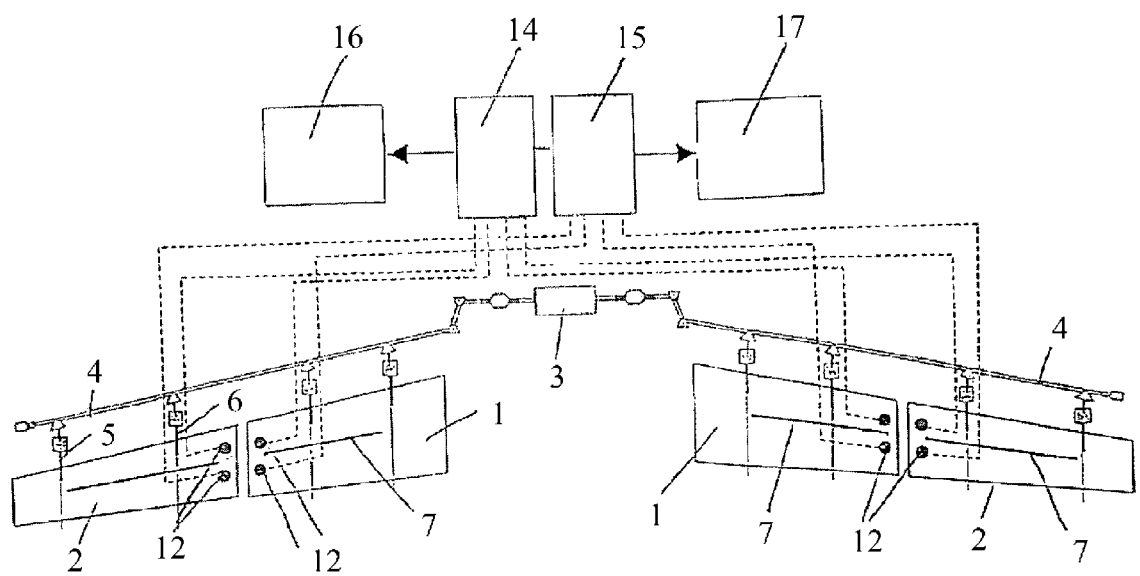
FIG. 1 is a principle illustration of adjustable landing flaps via a shaft of a central drive unit with evaluation units.
Figure 2:
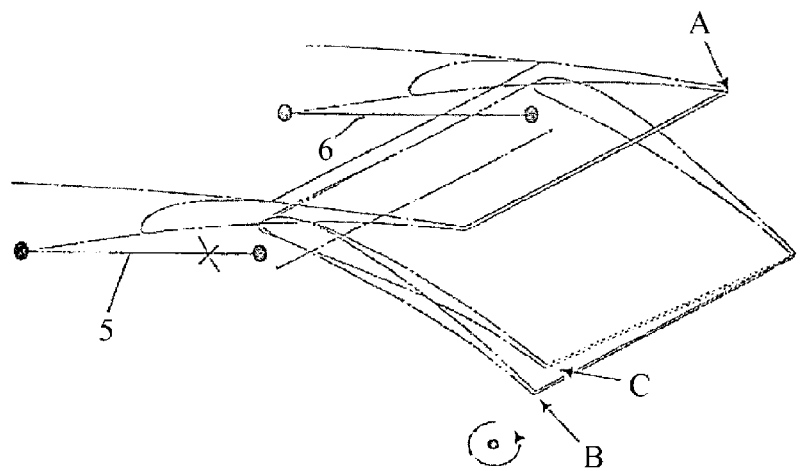
FIG. 2 is a schematic illustration with a flap in a retracted (A) extended state (B) as well as with breakdown (C) of an adjusting element.
Figure 3:
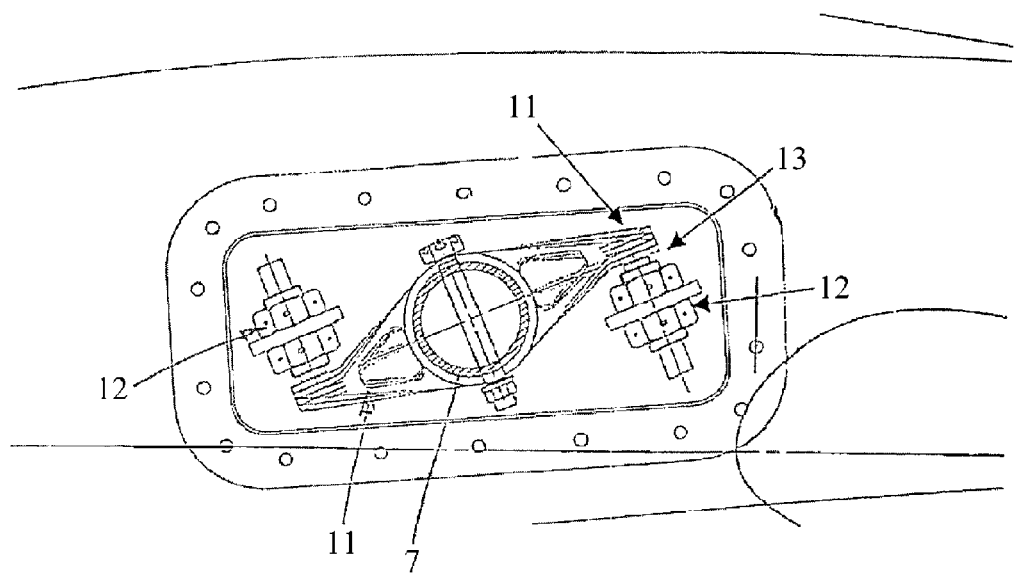
FIG. 3 shows a measuring assembly of the flap with fixedly associated, opposite measuring arms on the transmission element and associated sensors.
Figure 4:
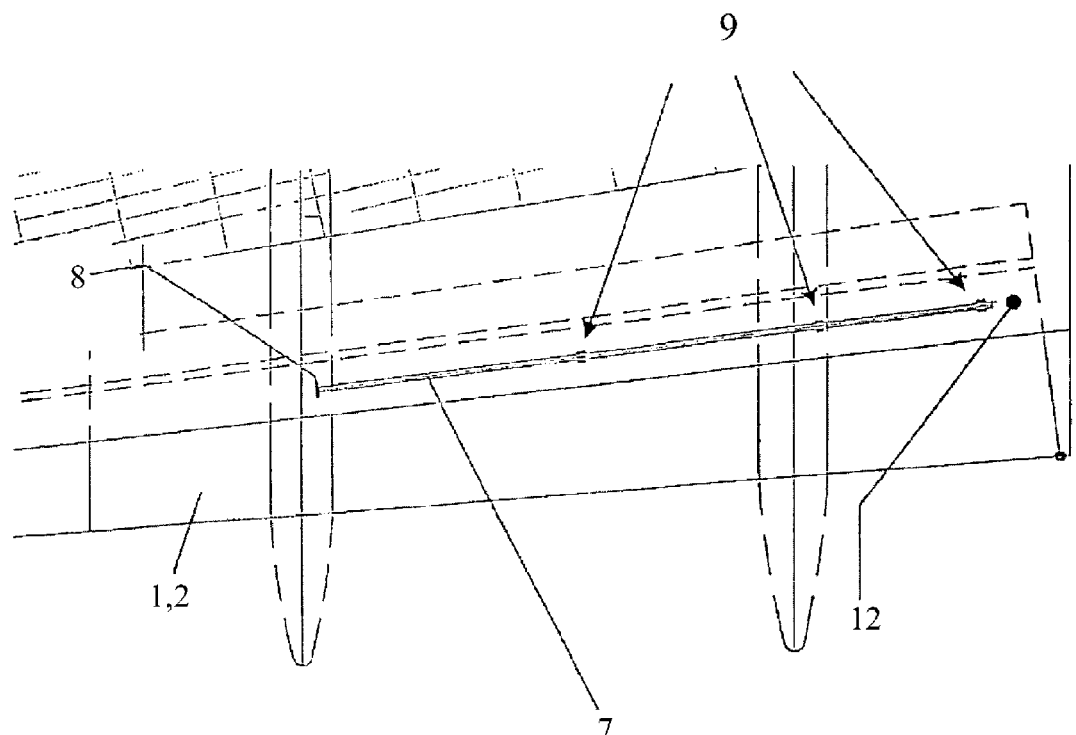
FIG. 4 is an enlarged illustration of a flap with associated transmission elements.

The following detailed description is merely exemplary in nature and is not intended to limit application and uses. Furthermore, there is no intention to be bound by any theory presented in the summary and background or the following detailed description of the invention.

With the shown assembly, two landing flaps 1 and 2 are arranged, respectively, on each wing side and are adjustable via a central drive unit 3 as well as a shaft 4. In this connection, each flap 1, 2 is held via two adjusting elements 5, 6 and pivotably adjustable.

Each flap 1, 2, is provided with a tube 7 as a transmission element arranged internally in the wing span, which is fixedly connected with the flap 1, 2 at one end 8 and is otherwise held rotatably via mountings 9. At an end 10 of the tube 7 opposite to the fixed end 8, parallel measuring arms 11 are fixedly arranged on the tube 7. These measuring arms 11 have respective associated sensors 12, which are mounted to the flap structure.

When an error occurs, a twisting of the flap 1, 2 occurs and a distance 13 between the sensor 12 and the measuring arm 11 changes, wherein the distance 13 is a measure for the twisting of the flap 1, 2.

The occurring sensor values are evaluated via the associated computer 14, 15, and upon exceeding an assigned threshold, the drive 3 is switched off via a connected control device 16, 17, so that the flaps 1, 2 are not longer moved.

In order obtain a duality of measurement results, two sensors 12 are assigned to each measurement point in this embodiment, which are evaluated and comparable via separate computers 14, 15, and the switching-off takes place via separate control devices 16, 17.

With the design of the measuring device via the computer 14, 15, the tolerances of the sensors 12, adjustment, as well as the necessary twisting of the flaps 1, 2 are taken into consideration from the different states of the flaps.

Therefore, an error of a local adjusting element 5, 6, can be detected as well as other errors of the transmission. By this central monitoring, error localization also is possible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents. It should also be noted that the term 'comprising' does not exclude other elements or steps and the 'a' or 'an' does exclude a plurality. Also elements described in association with different embodiments may be combined.

The invention claimed is:

1. A device for error detection of an adjustable flap of an aircraft wing, comprising:
   a transmission element arranged in the aircraft wing, rotatably held on the adjustable flap, and fixedly connected in a first end region of the adjustable flap;
   an element at a second end region of the adjustable flap as a reference point;
   a sensor associated with the reference point for detecting a distance change; and
   a fixedly associated measuring arm supported by the transmission element for forming the reference point that is associated with the sensor.

2. The device of claim 1, wherein the transmission element is a tube.

3. The device of claim 1, wherein the transmission element is a rod.

4. The device of claim 1, wherein the sensor at the reference point detects the distance change by a twisting with an asymmetry of the adjustable flap.

5. The device of claim 1, wherein the sensor at the reference point detects the distance change by a torsion of the adjustable flap.

6. The device of claim 1, further comprising an evaluation unit configured to receive a measured value of the sensor.

7. The device of claim 6, further comprising a second sensor in a parallel arrangement with the sensor and a second evaluation unit, wherein the second evaluation unit is configured to receive a second measured value from the second sensor.

8. The device of claim 7, wherein the measured value and the second measured value are compared and upon deviation of a predetermined threshold, a unit drive configured to adjust the adjustable flap is switched off.

9. The device of claim 6, wherein evaluation units comprise a comparison unit.

10. The device of claim 6, wherein evaluation units comprise a computer.

11. The device of claim 1, wherein the sensor is a turbulence sensor.

12. The device of claim 1, wherein the sensor is an inductive sensor.

13. The device of claim 1, wherein the sensor is mounted to a flap structure.

14. A device for error detection of an adjustable flap of an aircraft wing, comprising:
   a transmission element arranged in the aircraft wing, rotatably held on the adjustable flap, and fixedly connected in a first end region of the adjustable flap;
   an element at a second end region of the adjustable flap as a reference point; and
   a sensor associated with the reference point for detecting a distance change,
   wherein the transmission element has oppositely, fixedly associated measuring arms for forming a plurality of reference points that are associated with at least the sensor arranged on the adjustable flap.

15. The device of claim 14, wherein the transmission element is a tube.

16. The device of claim 14, wherein the transmission element is a rod.

17. The device of claim 14, wherein the sensor at the reference point detects the distance change by a twisting with an asymmetry of the adjustable flap.

18. The device of claim 14, wherein the sensor at the reference point detects the distance change by a torsion of the adjustable flap.

19. The device of claim 14, wherein the transmission element has oppositely, fixedly associated measuring arms for forming a plurality of reference points that are associated with at least the sensor arranged on the adjustable flap.

20. The device of claim 14, further comprising an evaluation unit configured to receive a measured value of the sensor.

21. The device of claim 20, further comprising a second sensor in a parallel arrangement with the sensor and a second evaluation unit, wherein the second evaluation unit is configured to receive a second measured value from the second sensor.

22. The device of claim 21, wherein the measured value and the second measured value are compared and upon deviation of a predetermined threshold, a unit drive configured to adjust the adjustable flap is switched off.

23. The device of claim 20, wherein evaluation units comprise a comparison unit.

24. The device of claim 20, wherein evaluation units comprise a computer.

25. The device of claim 14, wherein the sensor is a turbulence sensor.

26. The device of claim 14, wherein the sensor is an inductive sensor.

27. The device of claim 14, wherein the sensor is mounted to a flap structure.

* * * * *